Dec. 29, 1959    A. G. BOSSARD    2,919,209
SINTERED OR BONDED CERAMIC REFRACTORY
BODY AND METHOD OF MAKING IT
Filed Jan. 4, 1955
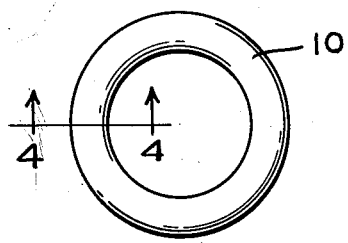
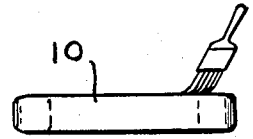
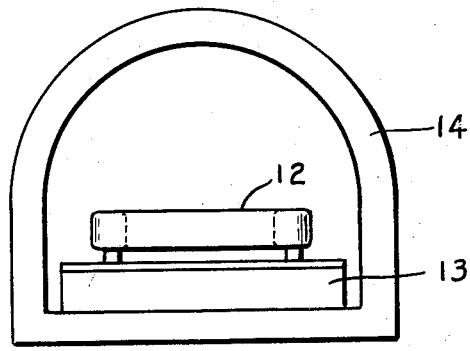
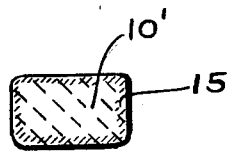
INVENTOR.
ALBERT G. BOSSARD
BY Clarence R. Batty, Jr.
ATTORNEY

United States Patent Office

2,919,209
Patented Dec. 29, 1959

---

2,919,209

SINTERED OR BONDED CERAMIC REFRACTORY BODY AND METHOD OF MAKING IT

Albert G. Bossard, Corning, N.Y., assignor to Corning Glass Works, Corning, N.Y., a corporation of New York Application January 4, 1955, Serial No. 479,867

13 Claims. (Cl. 117—123)

This invention relates to sintered or bonded, ceramic refractory bodies of high corrosion resistance, which are suitable for use in contact with molten silicate glass in a continuous tank furnace or other glass melting container.

In the operation of a continuous tank it is essential that the molten glass be delivered to the glass-working machines or to the hand gathering ports in a homogeneous condition free of gas bubbles. Delivery normally is by means of a forehearth equipped with an automatic feeding device or a forebay equipped with a floating ring or other skimming device and a gathering port. Such delivery means are provided with suitable corrosion-resistant refractory parts in contact with the molten glass, such as for example a body composed essentially of zircon ($ZrSiO_4$), which is particularly suitable for use with low-expansion borosilicate glasses, high alumina refractory bodies containing over 60% by weight of $Al_2O_3$, which are suitable for use with most glasses, and the like.

The initial use of such refractory parts after being newly installed is accompanied by a temporary substantial formation and evolution of blisters or gas bubbles at the interface between the molten glass and the refractory parts. While the glass is normally free of blisters and seeds after having passed through the fining chamber of the tank, such evolution of blisters in the forehearths and forebays renders the glass therefrom unfit for use. Fortunately the formation of blisters on such newly installed refractory parts is temporary and after a week or two it ceases and does not reoccur during the life of the refractory parts. The preliminary loss of production and waste of fuel resulting therefrom, however, constitute a very substantial economic loss, the prevention of which is highly desirable.

Fig. 1 is a plan view of a floating ring of a conventional type utilized in the forehearth of a glass melting tank.

Fig. 2 is an elevation view of a method of introducing into the surface of the ring of Fig. 1 desirable oxides according to this invention.

Fig. 3 is an elevation view of a method of firing the treated ring of Fig. 2 according to this invention.

Fig. 4 is a cross-section view, taken along plane 4—4 of Fig. 1, showing the treated, but unglazed, zone of the ring according to this invention.

It is an object of this invention to provide a method of treating refractory bodies, which have such a tendency for the interfacial formation of blisters, before contacting them with molten glass, whereby the above-described difficulties and disadvantages can be overcome and the objectional blistering can be prevented. Broadly the new method according to the invention comprises introducing into the surface of at least the glass-contacting face of the refractory body a compound of lithium, sodium, or potassium in an amount equivalent to about 0.001 to 0.01 mol of the respective alkali metal oxide per 100 g. of the treated portion of the body, and heating the treated body to at least 1400° C. before contacting it with the molten glass.

The invention also includes the treated refractory body resulting from such method.

The alkali metal compound may be introduced into the surface of the refractory body preferably by treating the surface with a solution of the compound in water or other solvent. Such method possesses the advantages that it is simple and easily carried out with a minimum of expense and it results in a uniform distribution of the alkali metal compound in the treated portion of the refractory body. Other methods of introducing the alkali metal compound into the surface of the refractory body, such as by contacting the body with the molten alkali metal compound, or by exposing its surface while heated to the fumes or vapor of the alkali metal compound, or by applying the alkali metal compound in the form of a powder to its surface and heating the body to cause penetration of the alkali metal compound or oxide into the surface, are less practicable but may be used advantageously in the case of compounds, such as fluorides, silicofluorides, complex salts, and the like, which are substantially insoluble in water or cannot be utilized as solutions.

Any compound of lithium, sodium, or potassium may be utilized for treating the surface of a refractory body according to the invention including inorganic salts and compounds, such as the carbonates, nitrates, nitrites, sulfates, hydrates, borates, fluorides, chlorides, bromides, iodides, sulfides, selenates, arsenates, antimonates, stannates, aluminates, phosphates, silicates, silicofluorides, thiocyanates, permanganates, perchlorates, persulfates, and the like; and organic salts and compounds, such as formates, acetates, citrates, oxalates, tartrates, propionates, saccharates, succinates, stearates, salicylates, lactates, benzoates, and the like, provided that the amount incorporated into the treated portion of the refractory body is equivalent to about 0.001 to 0.01 mol of the respective alkali metal oxide per 100 g. of the treated portion. Amounts below this range are ineffective or do not diminish the blistering tendency of the refractory body to a practicable extent but amounts above this range, although effective, objectionably decrease its corrosion resistance.

I prefer to use sodium compounds on account of their lower cost, and particularly $Na_2CO_3$ on account of its easy availability and solubility and the general innocuousness of the carbonate radicle.

The alkali metal or its oxide per se appears to be the effective part of the compound. Although complex alkali metal compounds containing other metals are effective in diminishing the formation of blisters at the glass-refractory interface, the use of complex compounds containing metals such as iron, chromium, vanadium and the like, which may contaminate the glass and objectionably alter its color or ultraviolet transmission, is not generally desirable. Poisonous compounds such as the cyanides are also undesirable, although effective for the prevention of blistering.

While I have found no alkali metal compound which is ineffective for my purpose, a few, for example NaOH and $Na_2SO_4$, have proved to be less effective than others and I am unable to explain the reason for this difference. The use of such compounds, although less practicable and less effective than one of the more preferable compounds, such as $Na_2CO_3$, is nevertheless within the scope of the invention as claimed.

Regardless of the method by which the alkali metal compound is introduced into the surface of the refractory body I have found that the depth of penetration does not normally exceed ¼ to ½ inch. Such depth, however, is ample for the purpose.

Refractory bodies suitable for treatment according to this invention may be fabricated by any known method but are preferably made by slip casting, since this results in low porosity and optimum density which are desirable properties for glass-contacting refractory bodies. The shaped refractory bodies are preferably fired before being processed according to the invention because better results are thus obtained than when the green or unfired body is treated before firing. It is necessary, however, to fire the body after it has been treated according to the invention and it preferably should then be fired for one hour or more at 1400° C. or above after it has been raised gradually to this temperature. Such firing eliminates the volatile part of the alkali metal compound in the surface of the body and, while it is believed that the alkali metal is thereafter combined at least with oxygen, it is not known if the alkali metal oxide forms a chemical combination with the other constituents of the refractory body.

If, on the other hand, the alkali metal compound is introduced into the refractory batch before its fabrication into the desired body, not only does this interfere with the slip casting process but it does not materially diminish the tendency of the body for the formation of blisters on contact with molten glass. It is all the more surprising then that the introduction of the alkali metal compound into the surface of the body followed by a heat treatment thereof should result in such a marked diminution in the tendency for the formation of blisters at the glass-refractory interface. The introduction of such powerful fluxes into refractory compositions is ordinarily avoided, especially if high corrosion-resistance at elevated temperatures is desired, and it would normally be expected that the above-described treatment of a refractory body would result in a decrease of its corrosion-resistance. Such is not the case, however, and I have been unable to observe any deleterious effects over a period of many months when the alkali metal compound is introduced in accordance with the invention in the amount and in the manner described above and in the following examples.

Example 1

A refractory body 10, in Fig. 1, of commercial size, which was composed essentially of refined zircon and formed by slip casting the body and firing it for about 12 hours at about 1550° C., and which experience had shown would normally cause blistering of the glass for about 2 weeks when brought into contact with a molten low expansion borosilicate glass at 1200–1300° C., was treated in the following manner, as illustrated in Figs. 2 and 3, before contact with the molten glass:

An aqueous solution, containing 20 g. $Na_2CO_3$ per 100 cc. of water and having a soda content of about 9.75% by weight computed as $Na_2O$, and a specific gravity of 1.173, was applied to the class-contacting face of the body in the proportion of 60 cc. or 6.85 g. $Na_2O$ per square foot of surface. Application of the solution was accomplished by repeatedly brushing it, with a brush 11 onto the surface of the refractory body 10 and allowing the applied solution to soak into the surface between applications until 60 cc. per square foot of surface had been absorbed.

After being dried, the treated refractory body was fired for about 2 hours at about 1400° C. after being raised gradually to that temperature by placing it on a suitable refractory support 13 in a furnace 14. By calculation the treated portion of the body theoretically should have contained about 0.33% $Na_2O$ by weight.

However, a small sample of the fired refractory body, a cross-section of which is shown in Fig. 4 as taken along plane 4—4 of Fig. 1 after treatment according to this invention described above, taken from within a layer extending inwardly ¼ inch from the treated surface 15 and another small sample taken from the interior untreated portion 10' were analyzed as accurately as possible to determine their soda contents. The resulting average $Na_2O$ content of the treated portion was about 0.15% by weight or about one half of the calculated amount and about 15 times greater than that of the untreated portion, which contained an average of about 0.009% by weight $Na_2O$ as an impurity in the original refractory body.

The treated refractory body was subsequently installed in a forehearth of a continuous tank and thereafter was brought into contact with a molten, low-expansion borosilicate glass in the normal operation of the tank. The treated refractory body displayed no tendency to form blisters at the refractory-glass interface.

The analysis of the refractory body described in Example 1 indicates that the amount of the alkali metal computed as the corresponding alkali metal oxide, which remains in the treated refractory body after it has been fired in the described manner, is about one half of the amount which was introduced into the body by the method of the invention. While such discrepancy is doubtless due largely to the volatilization of some of the alkali metal during the subsequent firing of the body, the degree of accuracy of the analytical result is uncertain.

The chemical analysis of refractory compositions comprising a very high content of zircon or alumina, which are suitable for use in contact with molten glass, is difficult and the determination of the percentage of alkali metal in such a body which has been treated according to the above-described method is not quantitative for the following reason. It has thus far been impossible to dissolve such compositions completely. The most successful procedure comprises leaching the pulverized refractory material in concentrated aqueous HCl at a temperature of about 300° C. under a pressure of more than 200 atmospheres in a sealed tube of high silica glass enclosed within an iron pipe. While such procedure results in the solution and leaching out of a substantial amount of the alkali metal from the composition, the amount of alkali metal left in the insoluble residue cannot be accurately determined. Nor can it be quantitatively estimated by spectrographic methods, in view of the fact that the large amounts of zirconium and aluminum in the compositions exert a masking effect of undetermined magnitude upon the spectral lines of the minor constituents and the resulting lack of reliable standards of comparison for the alkali metals in such compositions.

In any event, it is certain that the amount of alkali metal oxide in the refractory body, after it has been treated and fired on a commercial scale, is substantially less than the calculated amount which was introduced thereinto by the method of the invention. The amount remaining in the treated portion, moreover, is substantially larger than the amount contained as an impurity in the untreated portion of the body. Refractory bodies which have been treated in accordance with the invention, therefore, are defined herein as containing in the treated portion about one half of the calculated amount which was introduced thereinto, since this is the amount appearing therein, from the best available analytical technique.

Example 2

Since the time required to evaluate the effectiveness of an alkali metal compound according to the invention on a large or commercial scale amounts to several weeks, the following accelerated test was devised for rapidly testing a large number of alkali metal compounds for their ability to stop or diminish such blister forming tendency. Small plates, about 30 mm. square and 5 mm. thick, were cut from a refractory block composed essentially of refined zircon which had been slip cast and fired for about 12 hours at about 1550° C. Each plate was treated by immersing it for 60 minutes in an aqueous solution of an alkali metal compound containing about 0.13 mol of the respective alkali metal oxide per 100 cc. of solution, corresponding to approximately 4 g. Li$_2$O, 8 g. Na$_2$O, or 12 g. K$_2$O per 100 cc. It was then dried, heated for 15 minutes at 1400° C. and a piece of low-expansion borosilicate glass was laid thereon after which heating at 1400° C. was continued for 15 minutes. At the end of this time the sample was cooled and compared with a similar but untreated plate which had been heated in a similar manner with a piece of the glass thereon as a control.

In each case the piece of glass had melted and spread over the surface of the plate, the glass on the untreated plate being filled with blisters. The glass on the plates which had first been treated with an aqueous solution of an alkali metal compound was in most cases substantially free of blisters and seeds and in two cases the glass contained only relatively small seeds. (The terms blister and seed are herein used to mean a gaseous inclusion of more or less than 1.5 mm. diameter respectively.)

The following alkali metal compounds were thus tested and proved to be effective: Na$_2$CO$_3$, K$_2$CO$_3$, NaOH, NaNO$_3$, KNO$_3$, LiNO$_3$, Na$_2$SO$_4$, Li$_2$SO$_4$,

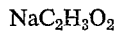

NaCl, KCl, LiCl, NaBr, NaI, NaF, KF, Na$_2$SiO$_3$, Na$_2$B$_4$O$_7$, NaK(C$_4$H$_4$O$_6$).3H$_2$O, NaH$_2$AsO$_4$.H$_2$O,

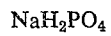

KCNS.

Example 3

In order to carry out experiments to test the efficiency of relatively insoluble alkali metal compounds, small refractory plates, such as those described in Example 2, were treated in the following manner. The dried alkali metal compounds were individually pulverized and spread on individual plates in the proportion equivalent to about 0.00108 mol of the respective alkali metal oxide per 9 sq. cm. of surface. (By calculation this corresponds to the quantity absorbed by each of the refractory plates of Example 2.) The coated plates were individually heated in an electric furnace for 15 minutes at 1400° C. and in each case a piece of low-expansion borosilicate glass was then placed on the treated surface and heating at 1400° C. was continued for 15 minutes. After being cooled each sample was compared with a similar but untreated plate which had been heated in a similar manner with a piece of the glass thereon as a control. Whereas the melted-down glass on the control specimen was filled with blisters, the glass on the plates which had been treated with the alkali metal compounds was in each instance free of blisters, although the few seeds remaining therein varied considerably in number. Such variation was due to the extreme difficulty of maintaining the pulverized alkali metal compound in a uniform layer and obtaining a uniform distribution thereof within the refractory plate. The non-uniform concentration of the alkali metal oxide near the surface of the refractory plate also tended to attack its surface objectionably. Consequently, this method is not as desirable as a method in which a solution of the alkali metal compound can be utilized, although it produces at least some of the benefits of the invention.

The following substantially insoluble alkali metal compounds were thus tested and found to be at least partially effective: Na$_2$SiF$_6$, NaAlO$_2$, Na$_2$SnO$_3$.3H$_2$O, K$_2$SiF$_6$, KClO$_4$, LiF, Li$_2$CO$_3$, and KSb(OH)$_6$.½H$_2$O.

To ascertain that soluble compounds also can be applied by this method, dry powdered Na$_2$CO$_3$ and Na$_2$SO$_4$ were used with similarly effective results.

Example 4

For the purpose of determining the maximum and minimum effective amounts of alkali metal compound or oxide to be introduced into the surface of a refractory body according to the invention, a series of small refractory plates similar to those referred to in Example 2 were individually treated by the method set forth in Example 2 with solutions of Na$_2$CO$_3$ in various concentrations. The increase in weight percent of each plate after being immersed, dried, and fired for 15 minutes was assumed to be the percent Na$_2$O introduced into the plate, since the relatively short time of firing as compared to the procedure on a commercial scale described in Example 1 is deemed insufficient to cause a substantial volatilization of Na$_2$O from the plate. The effectiveness of the various treatments set forth in the following table is estimated from the number of bubbles formed at the refractory-glass interface of the treated plate compared with the number formed on an untreated plate, the absence of bubbles from the interface of the treated plate indicating 100% effectiveness.

| Concentration of solution, percent by weight | Percent Na$_2$O in Plate | Percent Effective |
|---|---|---|
| 1.25 | 0.018 | 0% (no attack). |
| 2.5 | 0.064 | 85% (no attack). |
| 5 | 0.133 | 100% (no attack). |
| 20 | 0.678 | 100% (very slight attack). |

Accordingly the calculated minimum effective percentage of Na$_2$O introduced into the refractory body amounted to about 0.06% by weight of the treated portion or approximately 0.001 mol of Na$_2$O per 100 g. of the treated portion, while the calculated maximum percentage without objectionable attack of the surface of the plate amounted to about 0.6% by weight or 0.01 mol of Na$_2$O per 100 g. The same molar range of Li$_2$O and K$_2$O is effective, corresponding to about 0.03% to 0.3% by weight Li$_2$O and 0.09% to 0.9% by weight K$_2$O respectively by calculation.

Since the most reliable analysis known at the present time shows that only about one-half of the calculated amount of the alkali metal oxide, which is introduced into the refractory body by the method of the invention, remains in the body after it has been fired on a commercial scale, as has been pointed out above, such refractory bodies are defined herein as containing about one-half of the calculated amount or a minimum effective amount of 0.0005 mol and a maximum effective amount of 0.005 mol of the respective alkali metal oxide per 100 g., or about 0.015% to 0.15% Li$_2$O, 0.03% to 0.3% Na$_2$O, and 0.045% to 0.45% K$_2$O, by weight.

Example 5

The efficiency of the method of the invention when utilized with a high alumina refractory body as compared to zircon bodies is demonstrated by the following example.

Large bore tubing of low expansion borosilicate glass was being produced by an updraw device in which refractory parts, comprising a bowl and bushing composed of zircon topped by a hollow drawing cone composed of an aluminum silicate composition contaning about 68% Al$_2$O$_3$, were immersed in the molten glass, the tubing being drawn upwardly off the tip of the cone.

During such procedure any gas bubbles which are incorporated into the glass tubing as it is being drawn are greatly attenuated into long hair like lines in the glass, referred to as air lines. When such air lines occur at the surface of the glass tubing they may, and often do, become fractured during the draw or during subsequent handling of the tubing. Such surface air lines, if fractured, are lodging places for bacteria and the presence of a single air line on the surface of the inner wall of a length of glass tubing renders the same unfit for use in pipe lines for dairies, wineries, canneries and other industrial plants where it is to be utilized for the transportation of foods and beverages requiring positive sterilization.

When the above described updraw device was placed in operation, inspection of the resulting tubing indicated that the average total number of air lines per pound of glass was 3.0 to 4.0 and the average number on the inner wall of the tubing was 2.0 to 2.5. The zircon parts were thereupon replaced by new zircon parts, which had been treated by the procedure described in Example 1, after which the inspection showed that the average total number of air lines per pound of glass was 2.0 to 2.5 and the average number for the inner wall was 1.4 to 1.5. The untreated drawing cone was then replaced by a new cone of the same high alumina composition, which had been treated by the method described in Example 1, so that bowl, bushing and cone had been so treated, and the inspection thereafter showed that the average total number of air lines per pound of glass was 0.5 to 1.0 while the average number for the inner wall was merely 0.0 to 0.5.

What is claimed is:

1. The method of minimizing the tendency for the formation of gas bubbles at the interface between a molten silicate glass and a preformed, low-porosity ceramic refractory body having such tendency, which comprises introducing into the surface of at least the glass-contacting face of the refractory body a compound of an alkali metal selected from the class consisting of lithium, sodium, and potassium in an amount equivalent to about 0.001 to 0.01 mol of the respective alkali metal oxide per 100 g. of the treated portion of the body, and heating the treated body to at least 1400° C.

2. The method of minimizing the tendency for the formation of gas bubbles at the interface between a molten silicate glass and a preformed, low-porosity ceramic refractory body having such tendency, which comprises treating the surface of at least the glass-contacting face of the refractory body with a solution of a compound of an alkali metal selected from the class consisting of lithium, sodium, and potassium until the treated portion of the body contains the equivalent of about 0.001 to 0.01 mol of the respective alkali metal oxide per 100 g. of the treated portion of the body, and heating the treated body to at least about 1400° C.

3. The method of minimizing the tendency for the formation of gas bubbles at the interface between a molten silicate glass and a preformed, low-porosity ceramic refractory body having such tendency, which comprises introducing into the surface of at least the glass-contacting face of the refractory body a sodium compound in an amount equivalent to about 0.06% to 0.6% $Na_2O$ by weight of the treated portion of the body, and heating the treated body to at least about 1400° C.

4. The method of minimizing the tendency for the formation of gas bubbles at the interface between a molten silicate glass, and a preformed, low-porosity ceramic refractory body having such tendency, which comprises treating the surface of at least the glass-contacting face of the refractory body with a solution of a sodium compound until the treated portion of the body contains the equivalent of about 0.06% to 0.6% $Na_2O$ by weight, and heating the treated body to at least about 1400° C.

5. The method of claim 4 in which the sodium compound is $Na_2CO_3$.

6. The method of minimizing the tendency for the formation of gas bubbles at the interface between a molten silicate glass and a preformed, low-porosity ceramic refractory body having such tendency, which comprises treating the surface of at least the glass-contacting face of the refractory body by repeatedly applying to such surface an aqueous solution containing about 16% $Na_2CO_3$ by weight and permitting the solution to be absorbed into the surface between applications until about 60 cc. of the solution per square foot of the surface have been absorbed, and then heating the treated body to at least about 1400° C.

7. The method of claim 1 in which the alkali metal compound is a potassium compound.

8. The method of claim 1 in which the alkali metal compound is a lithium compound.

9. A unitary ceramic refractory body for use in contact with molten silicate glass, which has a low porosity throughout and a uniform composition except in the glass-contacting surface layer which, for a thickness of about ¼ inch, contains in addition to the constituents of the remainder of the body an alkali metal oxide selected from the group consisting of $Li_2O$, $Na_2O$, and $K_2O$ and amounting to an average of about 0.0005 to 0.005 mol per 100 g., the amount of alkali metal oxide in such layer substantially exceeding the amount in the interior portion of the body.

10. A unitary ceramic refractory body for use in contact with molten borosilicate glass, which has a low porosity throughout and which consists primarily of zircon and in which a layer comprising the glass-contacting surface and having a thickness of about ¼ inch additionally contains an alkali metal oxide selected from the group consisting of $Li_2O$, $Na_2O$, and $K_2O$, and amounting to an average of about 0.0005 to 0.005 mol per 100 g., the amount of alkali metal oxide in such layer substantially exceeding the amount in the interior portion of the body.

11. A unitary ceramic refractory body according to claim 9 in which the alkali metal oxide amounts to about 0.03% to 0.3% $Na_2O$ by weight.

12. A unitary ceramic refractory body according to claim 9 in which the alkali metal oxide amounts to about 0.045% to 0.45% $K_2O$ by weight.

13. A unitary ceramic refractory body according to claim 9 in which the alkali metal oxide amounts to about 0.015% to 0.15% $Li_2O$ by weight.

References Cited in the file of this patent

UNITED STATES PATENTS

| | | |
|---|---|---|
| 2,141,930 | Partridge | Dec. 27, 1938 |
| 2,681,865 | Heine | June 22, 1954 |
| 2,771,376 | Capellman | Nov. 20, 1956 |
| 2,830,348 | Busby et al. | Apr. 15, 1958 |

OTHER REFERENCES

"Reactions Between Glass and Refractory Walls—Attack of Bubbles in Glass on Refractory Materials," Johannes Loffler, Glasstechnische Berichte, vol. 27, No. 11, pp. 415–417, November 1954 (Pat. Off. Lib.).

"Solution Processes on Tank Blocks," Edward Steinhoff, Glasstechnische Berichte, vol. 27, No. 9, pp. 309–319, September 1954. (Available in Patent Office Library).

"Study of the Phenomena Occurring at the Contact Between Glass and Oxide at High Temperatures by Measurement of the Electrical Potential," E. Plumat, Silicates Industrieles, vol. 19, No. 4, pp. 141–154, April 1954. Abstract on p. 141(e) of Ceramics Abstracts in Division 56 of the Patent Office. (Copy of original available in the library of the Corning Glass Works—according to information given in Chem. Abstracts.)